US009650247B2

(12) United States Patent
Ishimoto et al.

(10) Patent No.: US 9,650,247 B2
(45) Date of Patent: May 16, 2017

(54) METHOD FOR PRODUCING METAL HYDRIDE (71) Applicant: TAIHEIYO CEMENT CORPORATION, Minato-ku (JP)

(72) Inventors: Tetsuya Ishimoto, Sakura (JP); Shoji Suzuki, Sakura (JP); Katsumi Matsui, Sakura (JP); Tomoki Hatsumori, Sakura (JP); Kazuhiko Tokoyoda, Sakura (JP)

(73) Assignee: TAIHEIYO CEMENT CORPORATION, Minato-ku (JP)

( * ) Notice: Subject to any disclaimer, the term of this patent is extended or adjusted under 35 U.S.C. 154(b) by 0 days.

(21) Appl. No.: 15/021,533

(22) PCT Filed: Sep. 25, 2014

(86) PCT No.: PCT/JP2014/075348
§ 371 (c)(1),
(2) Date: Mar. 11, 2016

(87) PCT Pub. No.: WO2015/046284
PCT Pub. Date: Apr. 2, 2015

(65) Prior Publication Data
US 2016/0244328 A1 Aug. 25, 2016

(30) Foreign Application Priority Data
Sep. 25, 2013 (JP) .................. 2013-198185

(51) Int. Cl.
C01B 6/04 (2006.01)
C01B 6/02 (2006.01)
(52) U.S. Cl.
CPC . C01B 6/04 (2013.01); C01B 6/02 (2013.01)
(58) Field of Classification Search
CPC .................... C01B 6/04; C01B 6/02
See application file for complete search history.

(56) References Cited

U.S. PATENT DOCUMENTS

2008/0279762 A1  11/2008  Akiyama et al.
2011/0147651 A1*  6/2011  Uesugi .................. C01B 3/0026
                                                      252/182.32

FOREIGN PATENT DOCUMENTS

CN    1478055 A    2/2004
CN    1803816 A    7/2006
(Continued)

OTHER PUBLICATIONS

International Search Report issued on Nov. 4, 2014 for PCT/JP2014/075348 filed on Sep. 25, 2014.
(Continued)

*Primary Examiner* — Stanley Silverman
*Assistant Examiner* — Syed Iqbal
(74) *Attorney, Agent, or Firm* — Oblon, McClelland, Maier & Neustadt, L.L.P.

(57) ABSTRACT

A method for efficiently producing a high-purity metal hydride without contamination of other metals while initiating reaction rapidly is provided.
A method for producing a metal hydride from a metal selected from the group consisting of Group 2 metals and Group 3 metals comprising:
(A) charging the pressure resistant container with the metal, introducing hydrogen into the container, and heating the container to initiate reaction, wherein a gauge pressure (a) is set to 0.1 to 1.5 MPa, a heating temperature (b) is set to 50 to 250° C., and a product of the gauge pressure and the heating temperature, a×b, is set in the range of 20 to 100;
(B) stopping the introduction of hydrogen to allow the reaction to proceed when the temperature in the reaction container is increased to a temperature higher by 10 to 100° C. than the heating temperature;
(C) introducing hydrogen of 0.1 to 1.5 MPa to allow the reaction to proceed when the temperature in the reac-
(Continued)

tion container is decreased to the temperature at which the introduction of the hydrogen has been stopped; and (D) repeating the steps (B) and (C) until an increase in temperature does not occur in the reaction container after the introduction of the hydrogen.

13 Claims, 2 Drawing Sheets

(56) References Cited

FOREIGN PATENT DOCUMENTS

| CN | 101003360 A | 7/2007 |
|---|---|---|
| CN | 101804964 A | 8/2010 |
| CN | 101910052 A | 12/2010 |
| CN | 102826511 A | 12/2012 |
| JP | 07-330305 A | 12/1995 |
| JP | 2150841 A1 | 12/1995 |
| JP | 2000-302423 A | 10/2000 |
| JP | 2004-091264 A | 3/2004 |
| JP | 2008-044832 A | 2/2008 |
| JP | 4083786 B2 | 4/2008 |
| JP | 2009-011987 A | 1/2009 |
| JP | 4425990 B2 | 3/2010 |

OTHER PUBLICATIONS

Combined Office Action and Search Report issued Oct. 28, 2016 in Chinese Patent Application No. 201480049262.5 with English translation of category of cited documents.

\* cited by examiner

METHOD FOR PRODUCING METAL HYDRIDE

TECHNICAL FIELD

The present invention relates to a method for producing a high-purity metal hydride stably.

BACKGROUND ART

An alkaline earth metal hydride such as magnesium hydride is expected to act as a hydrogen storage system which is reversible between the metal hydride and metal, and various production methods thereof have been reported. For example, a method for hydrogenating particulate magnesium with a magnesium catalyst in a fine particle form having high reactivity (Patent Literature 1), a method for hydrogenating magnesium by removing the surface coating of raw material powder while maintaining a temperature at a specific level (Patent Literature 2), and a method including going through a compressed material obtained by accumulating and compressing a plurality of magnesium flakes (Patent Literature 3) have been reported.

CITATION LIST

Patent Literature

[Patent Literature 1]
  JP-A-7-330305
[Patent Literature 2]
  JP-B-4083786
[Patent Literature 3]
  JP-B-4425990

SUMMARY OF THE INVENTION

Technical Problem

These conventional production methods, however, have the following problems: the production of magnesium in a fine particle form for use as catalyst is difficult; and the product is contaminated by iron derived from a reaction container due to a runaway reaction resulting from the extremely large reaction heat of hydrogenation.

In the case of using a metal hydride as hydrogen storage material, the contamination of a small amount of metal causes no problem. Meanwhile, according to a recent report, a metal nitride can be used as fluorescent material. It is known that the metal nitride can be produced from a metal hydride. The metal hydride as an intermediate product of such a fluorescent material is required to have a high purity, and therefore contamination of even small amounts of other metals is required to be prevented.

Accordingly, an object of the present invention is to provide a method for efficiently producing a high-purity metal hydride without contamination of other metals while initiating the reaction rapidly.

Solution to Problem

The present inventors, therefore, made extensive investigation to achieve the rapid initiation of the reaction and the prevention of runaway of reaction heat due to proceeding of the hydrogenation of metal. As a result, the present inventors have found that when the reaction successively proceeds through simultaneous control of the reaction temperature and the amount of hydrogen to be introduced, the runaway of the reaction heat can be prevented to efficiently obtain a high-purity metal hydride. The present invention has been thus accomplished.

Namely, the present invention provides the following [1] to [4].

[1] A method for producing a metal hydride from a metal selected from the group consisting of Group 2 metals and Group 3 metals comprising:

(A) charging a pressure resistant container with the metal, introducing hydrogen into the container, and heating the container to initiate a reaction, wherein a gauge pressure (a) is set to 0.1 to 1.5 MPa, a heating temperature (b) is set to 50 to 250° C., and a product of the gauge pressure and the heating temperature, a×b, is set in the range of 20 to 100;

(B) stopping the introduction of hydrogen to allow the reaction to proceed when the temperature in the reaction container is increased to a temperature higher than the heating temperature by 10 to 100° C.;

(C) introducing hydrogen of 0.1 to 1.5 MPa to allow the reaction to proceed when the temperature in the reaction container is decreased to the temperature at which the introduction of hydrogen has been stopped; and (D) repeating the steps (B) and (C) until an increase in temperature does not occur in the reaction container after the introduction of the hydrogen.

[2] The method for producing a metal hydride according to [1], wherein an amount of hydrogen introduced in the steps (A) and (C) is 0.002 to 0.2 of the theoretically required amount.

[3] The method for producing a metal hydride according to [1] or [2], wherein the maximum temperature in the reaction container in each of the steps is 800° C. or lower.

[4] The method for producing a metal hydride according to any one of [1] to [3], wherein an average size of the metal as a raw material is 0.1 mm to 300 mm.

Advantageous Effects of Invention

According to the method of the present invention, the rapid increase of reaction heat in the hydrogenation reaction can be prevented, and a high-purity metal hydride can be stably obtained under low temperature conditions.

DESCRIPTION OF EMBODIMENTS

The method for producing a metal hydride from a metal selected from the group consisting of Group 2 metals and Group 3 metals of the present invention comprises the following steps (A) to (D):

(A) charging a pressure resistant container with the metal, introducing hydrogen into the container, and heating the container to initiate a reaction, wherein a gauge pressure (a) is set to 0.1 to 1.5 MPa, a heating temperature (b) is set to 50 to 250° C., and a product of the gauge pressure and the heating temperature, a×b, is set in the range of 20 to 100;

(B) stopping the introduction of hydrogen to allow the reaction to proceed when the temperature in the reaction container is increased to a temperature higher by 10 to 100° C. than the heating temperature;

(C) introducing hydrogen of 0.1 to 1.5 MPa to allow the reaction to proceed when the temperature in the reaction container is decreased to the temperature at which the introduction of the hydrogen has been stopped; and (D) repeating the steps (B) and (C) until an increase in temperature does not occur in the reaction container after the introduction of the hydrogen.

A raw material for the method of the present invention includes a metal selected from Group 2 metals and Group 3 metals. Among the metals, lanthanum, calcium, strontium, cerium, gadolinium and yttrium are preferred, and lanthanum, calcium and strontium are particularly preferred.

The size of the metal for use is not required to be particulate as in Patent Literature 1, and preferably not to be exceptional particulate from a viewpoint of preventing rapid reaction. Specifically, the metal has preferably a maximum size of 300 mm or less, more preferably has an average size of 200 mm or less, furthermore preferably 150 mm or less, in order that the metal does not remain in a metal hydride produced and that the metal fits into the reaction container. Further, in order to avoid a rapid exothermic reaction for securing safety, the average size is preferably 0.1 mm or more, more preferably 0.5 mm or more, furthermore preferably 1 mm or more. More specifically, the average size is preferably 0.1 mm to 300 mm, more preferably 0.5 mm to 200 mm, furthermore preferably 1 mm to 150 mm.

The method of the present invention is useful when a large amount of heat is generated by a rapid reaction, and therefore it is more preferable to increase the amount of the metal to be reacted at once. Specifically, the amount of metal to be reacted at once is preferably 0.3 mol or more, more preferably 0.5 mol or more, furthermore preferably 1 mol or more.

The pressure resistant container for use in the reaction is preferably made of SUS, more preferably made of nickel alloy (specifically, INCONEL (registered trademark) and HASTELLOY (registered trademark)).

The feed volume of the metal in the pressure resistant container in the step (A) is preferably 10 vol % or more, more preferably 25 vol % or more, furthermore preferably 40 vol %, relative to the internal volume of the pressure resistant container, in order to prevent rapid heat generation due to an increase in hydrogen to be reacted. The upper limit of the feed volume of the metal is preferably 50 vol %.

In the step (A), at initiation of the reaction by charging a pressure resistant container with the metal, introducing hydrogen into the container, and heating, the gauge pressure (a) is set to 0.1 to 1.5 MPa, the heating temperature (b) is set to 50 to 250° C., and the product (a×b) of the gauge pressure and the heating temperature is set in the range of 20 to 100.

In the case where a gauge pressure of hydrogen is less than 0.1 MPa, the reaction is not initiated in some cases, or much time is required until the reaction is initiated. In the case where a gauge pressure of hydrogen is more than 1.5 MPa, rapid heat generation occurs when the reaction is initiated.

For the initiation of the reaction, the heating temperature is required to be 50° C. or higher. It is important that the temperature is not higher than 250° C. for the suppression of the rapid reaction. The temperature may be determined from direct measurement of the temperature of a substance in the container by using a thermocouple or the like, or measurement by using radiation thermometer without contact.

From viewpoints of initiating the reaction and suppressing a rapid reaction, the product (a×b) of the gauge pressure and the heating temperature is required to be adjusted in the range of 20 to 100. With the product (a×b) being less than 20, the reaction is not initiated. On the other hand, with the product (a×b) being more than 100, rapid heat generation occurs when the reaction is initiated.

The gauge pressure (a) is preferably 0.1 to 1.3 MPa, more preferably 0.2 to 1.3 MPa, further preferably 0.25 to 1.3 MPa, furthermore preferably 0.3 to 1.0 MPa. The heating temperature (b) is preferably 60 to 250° C., more preferably 60 to 200° C., furthermore preferably from 80 to 200° C. The product (a×b) is preferably 20 to 90, more preferably 30 to 90.

In the step (A), hydrogen with 0.002 to 0.2 of the theoretically required amount is introduced in a reaction container. With the amount of hydrogen introduced being less than 0.002, it takes much time for the reaction to complete. On the other hand, with the amount of hydrogen introduced being more than 0.2, rapid heat generation occurs due to the reaction. The amount of hydrogen introduced is more preferably 0.003 to 0.1, furthermore preferably 0.005 to 0.05. The amount of hydrogen can be determined from the measurement by a flowmeter and the volume of the container, or the number of repetitions of the steps (B) and (C).

In the step (B), when the temperature in the reaction container is increased to a temperature higher by 10 to 100° C. than the heating temperature in the step (A) after the initiation of the reaction, the introduction of hydrogen is stopped to allow the reaction to proceed. In the case where the introduction of hydrogen is continued until the temperature in the reaction container reaches a temperature higher than the heating temperature in the step (A) by more than 100° C., the temperature is increased rapidly due to progress of the reaction, which may be uncontrollable. On the other hand, in the case where the temperature does not reach a temperature higher than the heating temperature in the step (A) by 10° C. or more, the reaction may stop in some cases. The introduction of hydrogen is stopped more preferably when the temperature is increased to a temperature higher than the heating temperature by 15 to 80° C., furthermore preferably by 25 to 60° C.

In the steps (A) and (B), the reaction conditions are controlled as described above, so that the hydrogenation reaction proceeds smoothly and rapid heat generation can be avoided to secure safety. With such a control, the highest temperature to be reached in the reaction container is preferably 800° C. or lower, more preferably 700° C. or lower, furthermore preferably 600° C. or lower. With the temperature being 800° C. or higher, the metal as a raw material may melt (for example, lanthanum has a melting point of 920° C., and a lanthanum-nickel alloy has a melting point of 517° C., in some cases), and a resulting hydride may decompose (for example, lanthanum hydride decomposes at about 1000° C.) Further, while the reaction proceeds with the introduction of hydrogen stopped in the step (B), cooling may be performed.

In the steps (A) and (B), when the introduction of hydrogen is stopped to allow the reaction to proceed, the temperature in the reaction container is increased to 800° C. or lower due to the hydrogenation reaction of metal as described above, and gradually decreases as the supplied hydrogen runs out. In the step (C), therefore, when the temperature in the reaction container is decreased to the temperature at which the introduction of the hydrogen has been stopped in the step (B), hydrogen is introduced to achieve a gauge pressure of 0.1 to 1.5 MPa to thereby allow the reaction to proceed again. With the gauge pressure of the hydrogen introduction being lower than 0.1 MPa, reaction may not occur in some cases or much time is required for the whole reaction to complete. On the other hand, with the gauge pressure being higher than 1.5 MPa, rapid heat generation occurs due to the reaction. The gauge pressure of the hydrogen introduction is more preferably 0.2 to 1.3 MPa, furthermore preferably 0.3 to 1.0 MPa.

When the temperature is decreased rapidly from the temperature at which the introduction of the hydrogen has been stopped, reaction does not occur in some cases. Therefore, the temperature may be maintained at 50 to 250° C., or heating may be performed again to reach 50 to 250° C. when the temperature is decreased too much. On this occasion, the product (a×b) is adjusted to more preferably 20 to 100.

In the step (C), hydrogen with 0.002 to 0.2 of the theoretically required amount is introduced into the reaction container. With an amount of hydrogen introduced less than 0.002, it takes much time to complete the reaction, while with an amount of hydrogen introduced more than 0.2, rapid heat generation occurs due to the reaction. The amount of hydrogen introduced is more preferably 0.003 to 0.1, furthermore preferably 0.005 to 0.05 of the theoretically required amount.

In the step (C) also, the reaction conditions are controlled as described above, so that the hydrogenation reaction proceeds smoothly and rapid heat generation can be avoided to secure safety. With such a control, the highest temperature to be reached in the reaction container is preferably 800° C. or lower, more preferably 700° C. or lower, furthermore preferably 600° C. or lower.

In the step (C) also, when a specific amount of hydrogen is introduced to allow the reaction to proceed, the temperature in the reaction container is increased to 800° C. or lower due to the hydrogenation reaction of metal as described above, and gradually decreased as the supplied hydrogen runs out.

In the step (D), therefore, the steps (B) and (C) are repeated until the temperature in the reaction container is not increased after introduction of hydrogen, so that hydrogen with a theoretically required amount is reacted with the metal. Since the degree of increase in temperature is different depending on the type of metal, the size of metal, the feed amount of metal, the size of reaction container, etc., the number of repetition is adjusted based on the reaction conditions such as the amount of hydrogen to be introduced in a single step.

After completion of the step (D), a high-purity hydride of the metal is produced in the reaction container. Since the reaction temperature is controlled, the deposition to the container by melting and the contamination of Fe, Ni, and the like derived from the reaction container can be prevented.

EXAMPLES

The present invention now will be described in detail by way of Examples.

Examples 1 to 4, Comparative Examples 1 to 4

Lanthanum Hydride ($LaH_2$)

(1) Control Method

A 0.5-L pressure resistant container was charged with 800 g of metal lanthanum having a size of 20 to 30 mm and, after vacuum evacuation, filled with hydrogen of (a) MPa (gauge pressure), and a reaction was then performed at a reaction temperature of (b)° C. for 12 hours. When the temperature in the reaction container reached a temperature of (b')° C., the hydrogen valve was closed, and when the internal temperature returned (cooled) to (b')° C., the valve was reopened. The procedure was repeated until the reaction completed.

(2) Actual Reaction

When the pressure resistant container was charged with hydrogen of (a) MPa of hydrogen, the external temperature was increased to (b)° C. On this occasion, as the hydrogenation reaction proceeded, the temperature in the reaction container was increased. When the temperature was not increased in 1-hour holding, it was determined that reaction did not occur. When the internal temperature reached (b')° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. When the reaction stopped and the internal temperature was cooled to (b')° C. again, the source pressure of hydrogen was changed to (a') MPa and the valve of the hydrogen line was reopened. The opening/closing of the valve for hydrogen supply at (b')° C. was then repeated. After 12 hours, heating at (b) was stopped, and the temperature was cooled to room temperature. After the content was taken out in a glove box, the product was identified by XRD. On this case, the highest temperature reached was the (c)° C. The initiation pressure (a), the initiation temperature (b), the product (a×b) of the gauge pressure and the initiation temperature, the control pressure (a'), the control temperature (b'), the reached temperature (c), and the number of repetition are described in Table 1. The operation state in Example 2 is shown in FIG. 1.

TABLE 1

Figure 1:
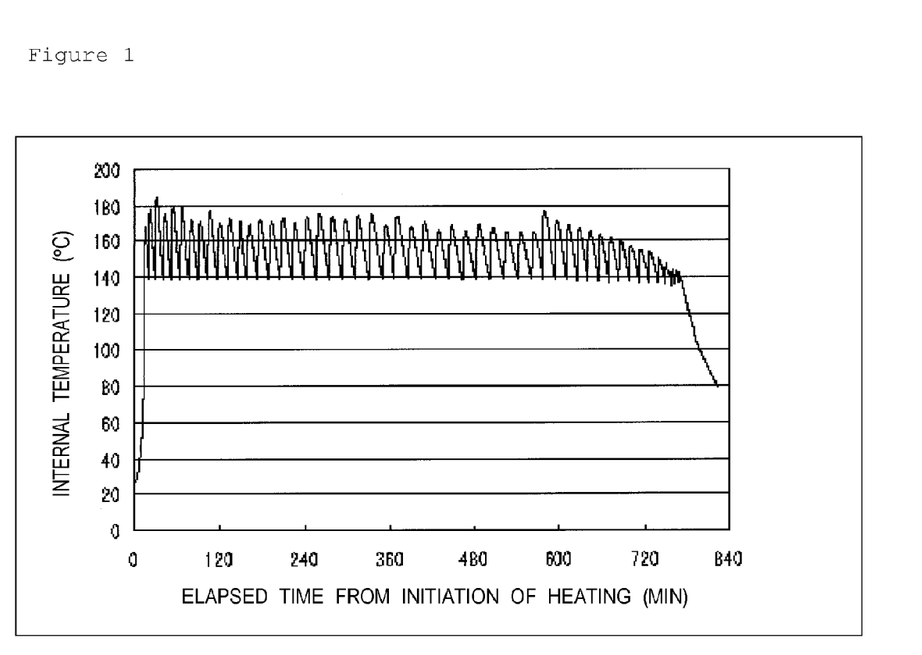
FIG. 1 is a chart showing the operation state in Example 2.

|  | a (Initiation pressure) | b (Initiation temperature) | a × b | b' (Control temperature) | a' (Control pressure) | c (Reached temperature) | Number of repetition | Result |
| --- | --- | --- | --- | --- | --- | --- | --- | --- |
| Comparative Example 1 | 0.1 | 100 | 10 | — | — | — | — | No reaction was initiated. |
| Comparative Example 2 | 0.3 | 25 | 7.5 | — | — | — | — | Until initiation of reaction, 2 hours was required. |
| Example 1 | 0.3 | 100 | 30 | 135 | 0.3 | 350 | 32 | Reaction was initiated in 15 minutes. |
| Example 2 | 0.3 | 100 | 30 | 135 | 0.2 | 200 | 50 | Operation state is shown in FIG. 1. |
| Example 3 | 0.1 | 200 | 20 | 230 | 0.1 | 250 | 113 | Reaction was initiated in 30 minutes. |
| Example 4 | 0.3 | 200 | 60 | 230 | 0.2 | 320 | 38 | Reaction was initiated in 5 minutes. |
| Comparative Example 3 | 0.5 | 25 | 12.5 | 150 | 0.5 | 650 | — | Until initiation of reaction, 1 hour was required, and temperature was increased to 650° C. in the second reaction. |

TABLE 1-continued

| | a (Initiation pressure) | b (Initiation temperature) | a × b | b' (Control temperature) | a' (Control pressure) | c (Reached temperature) | Number of repetition | Result |
|---|---|---|---|---|---|---|---|---|
| Comparative Example 4 | 0.9 | 25 | 22.5 | — | — | 900 | — | Although reaction was initiated in 30 minutes, temperature was increased to 900° C. when reaction initiated. |

(3) Results

As shown in Table 1, in Comparative Example 1, no reaction occurred when hydrogen was supplied and heated. In Comparative Examples 2 and 3, although hydrogen was supplied, it took much time until initiation of the reaction. In Comparative Examples 3 and 4, the temperature reached 600° C. or higher in the second time or at the initiation of the reaction.

Figure 2:
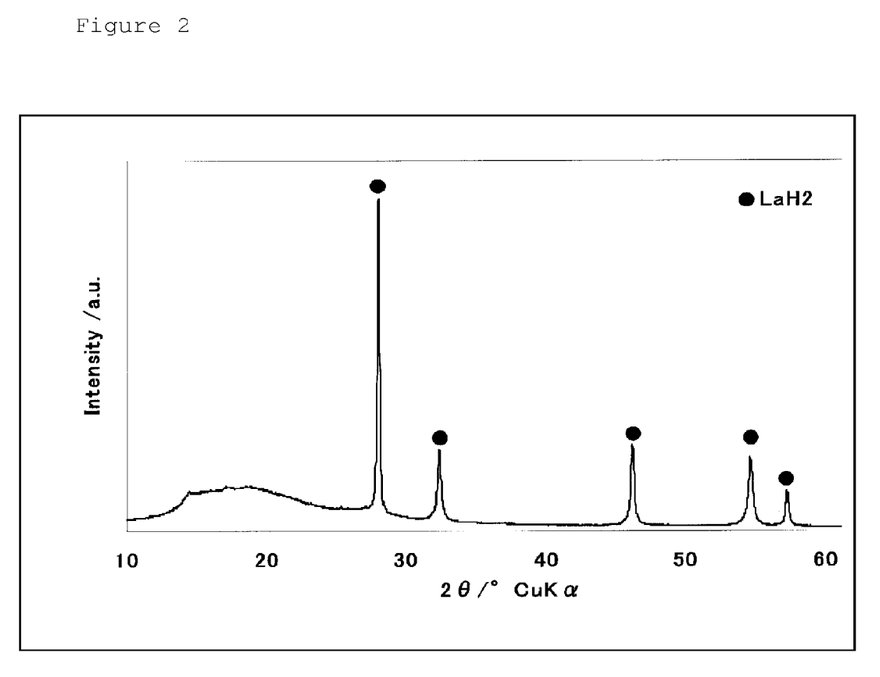
FIG. 2 is a chart showing the XRD pattern of $LaH_2$ obtained in Example 2.

In Examples 1 to 4, the reaction occurred within one hour, and the highest temperature reached when the valve was closed sufficiently satisfied the criteria for the specified temperature. The product was identified as $LaH_2$ from XRD data (FIG. 2).

Comparative Example 5

Lanthanum Hydride ($LaH_2$)

(1) Control Method

Although the reaction was initiated in the same way as in Example 1, the supply of hydrogen was continued without closing of the hydrogen valve when the temperature in the reaction container reached 135° C.

(2) Results

The temperature was not able to be controlled, and La metal was deposited by melting.

Examples 5 to 7

Lanthanum Hydride ($LaH_2$)

(1) Control Method

A 16-L pressure resistant container was charged with metal lanthanum having a size of 70 to 150 mm and, after vacuum evacuation, filled with hydrogen of (a) MPa, and a reaction was then performed at a reaction temperature of (b)° C. for 12 hours. When the temperature in the reaction container reached (b')° C., the hydrogen valve was closed, and when the internal temperature returned (cooled) to (b')° C., the valve was reopened. The procedure was repeated until the reaction completed.

(2) Actual Reaction

When the pressure resistant container was charged with hydrogen of (a) MPa (gauge pressure), the external temperature was increased to (b)° C. On this occasion, as the hydrogenation reaction proceeded, the temperature in the reaction container was increased. When the temperature was not increased in 1-hour holding, it was determined that reaction did not occur. When the internal temperature reached (b')° C., the valve of the hydrogen line was closed to stop the hydrogenation reaction. On this occasion, the reaction proceeded as long as the hydrogen was present in the reaction container, so that the internal temperature continued to rise and the internal pressure became a vacuum. When the reaction stopped and the internal temperature was cooled to (b')° C. again, the source pressure of hydrogen was changed to (a') MPa and the valve of the hydrogen line was reopened. The opening/closing of the valve for hydrogen supply at (b')° C. was then repeated. After 12 hours, heating at (b)° C. was stopped, and the temperature was cooled to room temperature. On this case, the highest temperature reached was the (c)° C. After the content was taken out in a glove box, the product was identified by XRD. The initiation pressure (a), the product (a×b), the initiation temperature (b), the product (a×b), the control temperature (b'), the control pressure (a'), the reached temperature (c), and the number of repetition are described in Table 2.

TABLE 2

| | Feed amount (kg) | a (Initiation pressure) | b (Initiation temperature) | a × b | b' (Control temperature) | a' (Control pressure) | c (Reached temperature) | Number of repetition |
|---|---|---|---|---|---|---|---|---|
| Example 5 | 4 | 0.3 | 125 | 37.5 | 135 | 0.3 | 350 | 100 |
| Example 6 | 10 | 0.3 | 125 | 37.5 | 200 | 0.3 | 300 | 260 |
| Example 7 | 8 | 0.5 | 125 | 37.5 | 180 | 0.5 | 380 | 140 |

(3) Results

In Examples 5 to 7, the reaction occurred within one hour, and the highest temperature reached when the valve was closed sufficiently satisfied the criteria for the specified temperature. The product was identified as $LaH_2$ from the XRD data.

Example 8

Strontium Hydride ($SrH_2$)

(1) Control Method

A 0.5-L pressure resistant container was charged with 500 g of metal strontium having a size of 10 to 30 mm and, after vacuum evacuation, filled with 0.7 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When the pressure resistant container was charged with 0.7 MPa of hydrogen, the external temperature was increased to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. When the reaction stopped and the internal temperature was cooled to 135° C. again, the valve of the hydrogen line was reopened. After that, the opening/closing of the valve for hydrogen supply at 135° C. was then repeated. The number of repetition was 23. After 12 hours, heating at 100° C. was stopped, and the temperature was cooled to room temperature. After the content was taken out in a glove box, the product was identified by XRD.

(3) Results

The highest temperature reached when the valve was closed was 250° C. or lower, which sufficiently satisfied the criteria for the specified temperature. The product was identified as $SrH_2$ from XRD data.

Example 9

Calcium Hydride ($CaH_2$)

(1) Control Method

A 0.5-L pressure resistant container was charged with 150 g of metal calcium having a size of 5 to 10 mm and, after vacuum evacuation, filled with 0.3 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When the pressure resistant container was charged with 0.3 MPa of hydrogen, the external temperature was raised to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. When the reaction stopped and the internal temperature was cooled to 135° C. again, the valve of the hydrogen line was reopened. After that, the opening/closing of the valve for hydrogen supply at 135° C. was then repeated. The number of repetition was 10. After 12 hours, heating at 100° C. was stopped, and the temperature was cooled to room temperature. After the content was taken out in a glove box, the product was identified by XRD.

(3) Results

The highest temperature reached when the valve was closed was 300° C. or lower, which sufficiently satisfied the criteria for the specified temperature. The product was identified as $CaH_2$ from XRD data.

Example 10

Cerium Hydride ($CeH_2$)

(1) Control Method

A 0.5-L pressure resistant container was charged with 100 g of metal cerium having a size of 20 to 30 mm, and, after vacuum evacuation, filled with 0.2 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When the pressure resistant container was charged with 0.2 MPa of hydrogen, the external temperature was increased to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. When the reaction stopped and the internal temperature was cooled to 135° C. again, the valve of the hydrogen line was reopened. After that, the opening/closing of the valve for hydrogen supply at 135° C. was then repeated. The number of repetition was 45. After 12 hours, heating at 100° C. was stopped, and the temperature was cooled to room temperature. After the content was taken out in a glove box, the product was identified by XRD.

(3) Results

The highest temperature reached when the valve was closed was 200° C. or lower, which sufficiently satisfied the criteria for the specified temperature. The product was identified as $CeH_2$ from XRD data.

Example 11

Gadolinium Hydride ($GdH_2$)

(1) Control Method

A 0.5-L pressure resistant container was charged with 100 g of metal gadolinium having a size of 40 to 60 mm and, after vacuum evacuation, filled with 0.2 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When the pressure resistant container was charged with 0.2 MPa of hydrogen, the external temperature was increased to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. When the reaction stopped and the internal temperature was cooled to 135° C. again, the valve of the hydrogen line was reopened. After that, the opening/closing of the valve for hydrogen supply at 135° C. was then repeated. The number of repetition was 20. After 12 hours, heating at 100° C. was stopped, and the temperature was cooled to room temperature. After the content was taken out in a glove box, the product was identified by XRD.

(3) Results

The highest temperature reached when the valve was closed was 200° C. or lower, which sufficiently satisfied the criteria for the specified temperature. The product was identified as GdH$_2$ from XRD data.

Example 12

Yttrium Hydride (YH$_2$)

(1) Control Method

A 0.5-L pressure resistant container was charged with 100 g of metal yttrium having a size of 20 to 30 mm and, after vacuum evacuation, filled with 0.2 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When the pressure resistant container was charged with 0.2 MPa of hydrogen, the external temperature was increased to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to rise and the internal pressure became a vacuum. When the reaction stopped and the internal temperature was cooled to 135° C. again, the valve of the hydrogen line was reopened. After that, the opening/closing of the valve for hydrogen supply at 135° C. was then repeated. The number of repetition was 45. After 12 hours, heating at 100° C. was stopped, and the temperature was cooled to room temperature. After the content was taken out in a glove box, the product was identified by XRD.

(3) Results

The highest temperature reached when the valve was closed was 200° C. or lower, which sufficiently satisfied the criteria for the specified temperature. The product was identified as YH$_2$ from XRD data.

Comparative Example 6

Strontium Hydride (SrH$_2$)

(1) Control Method

A 0.5-L pressure resistant container was charged with 300 g of metal strontium having a size of 10 to 30 mm and, after vacuum evacuation, filled with 1.7 MPa of hydrogen, and a reaction was then performed at a reaction temperature of 100° C. for 12 hours. When the temperature in the reaction container reached 135° C., the hydrogen valve was closed, and when the internal temperature returned (cooled) to 135° C., the valve was reopened. The procedure was repeated until the reaction completed.

(2) Actual Reaction

When a 500-cc pressure resistant container was charged with 1.7 MPa of hydrogen, the external temperature was increased to 100° C. On this occasion, as the hydrogenation reaction proceeded, the temperature in the reaction container was increased. When the internal temperature reached 135° C., the valve of the hydrogen line was closed to stop the hydrogenation reaction. On this occasion, the reaction proceeded as long as the hydrogen was present in the reaction container, so that the internal temperature continued to be increased and the internal pressure became a vacuum. The internal temperature was increased to 900° C. When the reaction stopped and the internal temperature was cooled to 135° C. again, the valve of the hydrogen line was reopened, with a pressure of 0.9 MPa maintained. After that, the opening/closing of the valve for hydrogen supply at 135° C. was then repeated. The number of repetition was 15. After 12 hours, heating at 100° C. was stopped, and the temperature was cooled to room temperature. After the content was taken out in a glove box, the product was identified by XRD.

(3) Results

While the hydride made in Example 8 had an Fe content of 15 ppm in the substance, the one made this time had an increased Fe content of 50 ppm.

The invention claimed is:

1. A method for producing a metal hydride from a metal selected from the group consisting of Group 2 metals and Group 3 metals comprising:
    (A) charging a pressure resistant container with the metal, introducing hydrogen into the container, and heating the container to initiate a reaction, wherein a gauge pressure (a) is set to 0.1 to 1.5 MPa, a heating temperature (b) is set to 50 to 250° C., and a product of the gauge pressure and the heating temperature, a×b, is set in the range of 20 to 100;
    (B) stopping the introduction of hydrogen to allow the reaction to proceed when the temperature in the reaction container is increased to a temperature higher by 10 to 100° C. than the heating temperature;
    (C) introducing hydrogen of 0.1 to 1.5 MPa to allow the reaction to proceed when the temperature in the reaction container is decreased to the temperature at which the introduction of hydrogen has been stopped; and
    (D) repeating (B) and (C) until an increase in temperature does not occur in the reaction container after the introduction of the hydrogen.

2. The method for producing a metal hydride according to claim 1, wherein an amount of hydrogen introduced in (A) and (C) is 0.002 to 0.2 of the theoretically required amount.

3. The method for producing a metal hydride according to claim 1, wherein a maximum temperature in the reaction container in (A), (B), (C) and (D) is 800° C. or lower.

4. The method for producing a metal hydride according to claim 1, wherein an average size of the metal as a raw material ranges from 0.1 mm to 300 mm.

5. The method for producing a metal hydride according to claim 1, wherein said metal is a Group 2 metal.

6. The method for producing a metal hydride according to claim 1, wherein said metal is a Group 3 metal.

7. The method for producing a metal hydride according to claim 1, wherein said metal is selected from the group consisting of lanthanum, calcium, strontium, cerium, gadolinium, and yytrium.

8. The method for producing a metal hydride according to claim 1, wherein said metal is selected from the group consisting of lanthanum, calcium, and strontium.

9. The method for producing a metal hydride according to claim 1, wherein an average size of the metal as a raw material ranges from 0.5 mm to 200 mm.

10. The method for producing a metal hydride according to claim 1, wherein an average size of the metal as a raw material ranges from 1 mm to 150 mm.

11. The method for producing metal hydride according to claim 1, wherein in (A), the gauge pressure (a) is 1 to 1.3 MPa, the heating temperature (b) is 60 to 250° C. and the product (a×b) is 20 to 90.

12. The method for producing metal hydride according to claim 1, wherein in (A), the gauge pressure (a) is 0.3 to 1.0

MPa, the heating temperature (b) is from 80 to 200° C., and the product (a×b) is 30 to 90.

13. The method for producing metal hydride according to claim 1, comprising (B) stopping the introduction of hydrogen to allow the reaction to proceed when the temperature in the reaction container is increased to a temperature higher by 25 to 60° C. than the heating temperature.

* * * * *